United States Patent [19]

Koppelmans et al.

[11] Patent Number: 5,544,266
[45] Date of Patent: Aug. 6, 1996

[54] TRANSCODING DEVICE

[75] Inventors: Johannes F. A. Koppelmans, The Hague; Arian Koster, Mijdrecht; Dolf A. Schinkel, Hillegom, all of Netherlands

[73] Assignee: Koninklijke Ptt Nederland N.V., Netherlands

[21] Appl. No.: 276,931

[22] Filed: Jul. 19, 1994

[30] Foreign Application Priority Data

Aug. 4, 1993 [NL] Netherlands .......................... 9301358

[51] Int. Cl.$^6$ .......................... G06K 9/36; H03M 7/30; H04N 7/12
[52] U.S. Cl. .......................... 382/238; 341/76; 348/402; 348/423
[58] Field of Search .......................... 341/76; 382/238, 382/234; 348/409, 410, 412, 413, 414, 423

[56] References Cited

U.S. PATENT DOCUMENTS

| | | | |
|---|---|---|---|
| 4,047,151 | 9/1977 | Rydbeck et al. | 340/146.1 |
| 4,825,285 | 4/1989 | Speidel et al. | 358/133 |
| 4,972,484 | 11/1990 | Theile | 381/37 |
| 5,121,202 | 6/1992 | Tanoi | 358/136 |
| 5,138,315 | 8/1992 | Le Queau et al. | 341/67 |
| 5,334,977 | 8/1994 | Kato | 341/76 |
| 5,422,672 | 6/1995 | Horst et al. | 348/402 |

FOREIGN PATENT DOCUMENTS

| | | | |
|---|---|---|---|
| 0500077 | 8/1992 | European Pat. Off. | G06F 5/00 |
| 57-166640 | 10/1982 | Japan | G06F 3/04 |
| 4192080 | 7/1992 | Japan | G06F 15/62 |
| 9200499 | 3/1992 | Netherlands | H04N 7/13 |
| 9201594 | 9/1992 | Netherlands | H03M 1/100 |

OTHER PUBLICATIONS

M. W. A. David et al., "A Third Generation Algorithm for use in High Definition Frame Rate Converters", *18th International Television Symposium and Technical Exhibition*, 10–15 Jun. 1993, cover & pp. 432–447.

C. Dosch, "Direct satellite broadcasting of digital HDTV in the 20 GHz frequency range", *EBU Review Technical*, No. 244, Dec. 1990, Brussels, BE, pp. 217–228.

M. Liebhold et al., "Toward an Open Environment for Digital Video", *Communications of the ACM*, Apr. 1991, vol. 34, No. 4, cover page and pp. 104–112.

B. Pank, "Picture Conversion for HD Graphics", *17th International Television Symposium and Technical Exhibition*, Montreux, Switzerland, 13–18 Jun. 1991, 2 cover pages and pp. 552–558.

Primary Examiner—Jose L. Couso
Assistant Examiner—Matthew C. Bella
Attorney, Agent, or Firm—Peter L. Michaelson, Esq.; John C. Pokotylo, Esq.; Michaelson & Wallace

[57] ABSTRACT

Known transcoders for compressed video signals comprise a decoder and a coder coupled thereto, between which a data signal is transmitted. Because compressed video signals comprise so-called difference pictures and normal pictures, both the decoder and the coder should have a feedback loop which is utilized in decoding and coding a difference picture and is not utilized in decoding and coding a normal picture. For example, for the purpose of prediction means (motion compensation and motion estimation) present in the feedback loop of the coder, much computation has to be carried out in the coder. The computation required is considerably reduced by concomitantly transmitting one or more information signals in addition to the data signal in a transcoder according to the invention, and complete decoding and complete coding no longer takes place.

30 Claims, 2 Drawing Sheets

TRANSCODING DEVICE

BACKGROUND OF THE INVENTION

The invention relates to a transcoding device comprising a decoding section for
— receiving a first coded bit stream, and
— converting the first coded bit stream into at least one data signal, and comprising a coding section for
— receiving at least one data signal, and
— converting at least one data signal into a second coded bit stream, which transcoding device has a coupling, situated between the decoding section and the coding section, for transporting at least one data signal.

Such a transcoding device is generally known, the decoding section being formed by a decoder and the coding section being formed by a coder. The decoder converts the first coded bit stream to be received, which represents a compressed video signal, into a data signal by decoding said bit stream. The coder converts this data signal to be received into the second coded bit stream, which represents the video signal in another way, for example in accordance with another standard or by only reducing the bit rate, by coding said data signal. Between the decoder and the coder there is the coupling for transporting the data signal which represents the video signal per se in uncoded form.

Because compressed video signals comprise so-called difference pictures and normal pictures, both the decoder and the coder should have a feedback loop which is utilized in decoding and coding a difference picture and is not utilized in decoding and coding a normal picture. For example, for the purpose of prediction means (motion compensation and motion estimation) present in the feedback loop of the coder, much computation has to be carried out in the coder.

Such a known transcoding device has, inter alia, the disadvantage that, for example, much computation has to be carried out in the coding section.

SUMMARY OF THE INVENTION

The object of the invention is, inter alia, to provide a transcoding device of the type mentioned in the preamble, in which the computation required is considerably reduced.

For this purpose, the transcoding device according to the invention has the characteristic that it has a further coupling, situated between the decoding section and the coding section, for transporting at least one information signal.

Because there is the further coupling between the decoding section and the coding section for transporting the information signal, information present in the information signal no longer has to be combined with the data signal in the decoding section and information present in said information signal no longer has to be computed completely in the coding section. At the same time, complete decoding no longer takes place in the decoding section and complete coding no longer takes place in the coding section, thereby economizing on computation.

The invention is based, inter alia, on the insight that certain operations take place in a decoder and that corresponding inverse operations take place in a coder, and the sum total of these operations can be dispensed with if the decoder and the coder are coupled to each other. In this case, it is necessary to speak of a decoding section instead of a decoder and of a coding section instead of a coder because complete decoding and coding no longer take place and the data signal transported between the decoding section and the coding section no longer represents per se the video signal in uncoded form, but the data signal transported between the decoding section and the coding section via the coupling represents, together with the information signal transported between the decoding section and the coding section via the further coupling, the video signal in another form which is still to some extent coded.

Of course, the coupling and the further coupling may be identical, for example as a result of multiplexing the data signal and the information signal by means of a multiplexer disposed in the decoding section and demultiplexing by means of a demultiplexer disposed in the coding section. An essential feature of the transcoding device according to the invention, however, remains the fact that the data signal transported between the decoding section and the coding section and information signal together represent the video signal in another form which is still to some extent coded, whereas, in the abovementioned, generally known transcoding device, the other data signal transported between the decoder and the coder represents the video signal in uncoded form.

A first embodiment of the transcoding device according to the invention has the characteristic that the decoding section is provided with data reprocessing means for generating a data signal, and demultiplexing means having an input for receiving the first coded bit stream and having a first output coupled to the data reprocessing means and having a second output for generating an information signal, the coding section being provided with data processing means for receiving a data signal, and— multiplexing means having a first input coupled to the data processing means and having a second input for receiving an information signal and having an output for generating the second coded bit stream, the coupling being disposed between the data reprocessing means and the data processing means, and the further coupling being disposed between the second output of the demultiplexing means and the second input of the multiplexing means.

The demultiplexing means selects, from the first coded bit stream, the information signal generated at the second output and, from the first coded bit stream, a signal which is generated at the first output and which is converted into the data signal by means of the data reprocessing means. The multiplexing means combines the information signal fed to the second input and another signal, which is fed to the first input and which is obtained by converting the data signal by means of the data processing means, to form the second coded bit stream.

A second embodiment of the transcoding device according to the invention has the characteristic that the data reprocessing means comprise a control input which is coupled to the second output, and the data processing means comprise a control input which is coupled to the second input.

Via the control inputs, the data reprocessing means and the data processing means are provided with information signals.

A third embodiment of the transcoding device according to the invention has the characteristic that the data reprocessing means comprise decoding means and inverse quantization means, and the data processing means comprise further quantization means and coding means.

In accordance with such a transcoding device, the second coded bit stream represents the video signal in accordance with the same standard as the first coded bit stream, but at a lower bit rate.

A fourth embodiment of the transcoding device according to the invention has the characteristic that the data reprocessing means comprise inverse transformation means and prediction means disposed in a feedback loop, and the data processing means comprise (further) transformation means and (further) prediction means disposed in a feedback loop containing therein inverse further quantization means and inverse (further) transformation means.

In accordance with such a transcoding means, the second coded bit stream represents the video signal in accordance with the same standard, but with one or more modified coding parameters, such as picture size, picture frequency or picture coding procedure, or in accordance with a standard other than the first coded bit stream.

A fifth embodiment of the transcoding device according to the invention has the characteristic that the information signal is a quantization control signal, the second output being a quantization control signal output and the second input being a quantization control signal input.

In this embodiment, the information signal is formed by the quantization control signal which is fed to the data reprocessing means (inverse quantization means) via a control input from the quantization control signal output of the demultiplexing means. Furthermore, the quantization signal is optionally processed, for example fed via a control unit to a control input of the data processing means (quantization means) and to the quantization control signal input of the multiplexing means. Because the quantization control signal is fed to the coding section, it no longer needs to be derived from the data signal, for which purpose much computation was previously necessary and is now saved.

A sixth embodiment of the transcoding device according to the invention has the characteristic that the information signal is a vector signal, the second output being a vector output and the second input a vector input.

In this embodiment, the information signal is formed by the vector signal which is fed to the data reprocessing means (prediction means) via a control input from the vector output of the demultiplexing means. Furthermore, the vector signal is optionally processed, for example fed via a translation unit to a control input of the data processing means (further prediction means) and to the vector input of the multiplexing means. In this case, the vector signal no longer has to be computed completely in the coding section because it is fed thereto.

A seventh embodiment of the transcoding device according to the invention has the characteristic that the information signal is a mode signal, the second output being a mode output and the second input being a mode input.

In this embodiment, the information signal is formed by the mode signal which is fed to the data reprocessing means (prediction means) via a control input from the mode output of the demultiplexing means. Furthermore, the mode signal is optionally processed, for example fed via a translation/ determination unit to a control input of the data processing means (further prediction means) and to the mode input of the multiplexing means. In this case, the mode signal no longer needs to be completely computed in the coding section because it is fed thereto.

An eighth embodiment of the transcoding device according to the invention has the characteristic that the information signal comprises a vector signal and a mode signal, the second output comprising a vector output and a mode output and the second input comprising a vector input and a mode input.

This eighth embodiment is a combination of the sixth and the seventh embodiment.

A ninth embodiment of the transcoding device according to the invention has the characteristic that the information signal comprises a quantization control signal, a vector signal and a mode signal, the second output comprising a quantization control signal output, a vector output and a mode output and the second input comprising a quantization control signal input, a vector input and a mode input.

This ninth embodiment is a combination of the fifth and the eighth embodiment.

Obviously, two or more of the embodiments mentioned may be combined in all possible ways.

References

Dutch Patent Application No. 9200499 (not pre-published)

Dutch Patent Application No. 9201594 (not pre-published)

Both Dutch patent applications are regarded as incorporated in this application by means of reference.

BRIEF DESCRIPTION OF THE DRAWINGS

The invention will be explained in greater detail with reference to an exemplary embodiment shown in the figures. In the latter.

DETAILED DESCRIPTION

Figure 1:
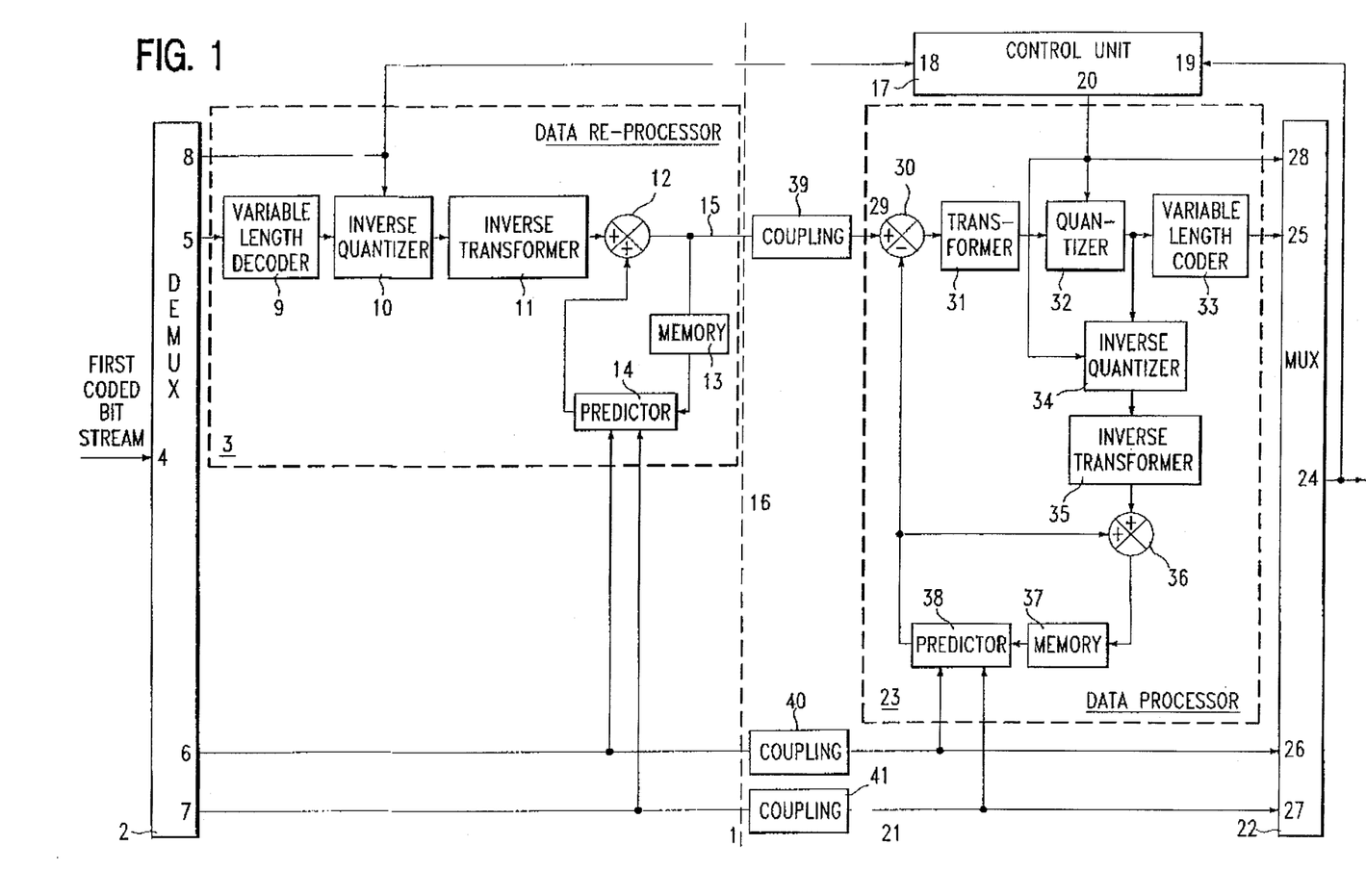
FIG. 1 shows a more complex version of a transcoding device according to the invention.

The transcoding device, or transcoder, shown in FIG. 1 is made up of a decoding section 1 and a coding section 21, which are mutually separated by broken line 16. Decoding section 1 comprises demultiplexing means, or demultiplexer, 2 and data reprocessing means 3. Demultiplexer 2 has an input 4 for receiving a first coded bit stream, a first output 5 for coupling to an input of data reprocessing means 3, and a second output which is made up of a vector output 6 for generating a vector signal, a mode output 7 for generating a mode signal, and a quantization control signal output 8 for generating a quantization control signal. Data reprocessing means 3 are provided with decoding means, or VLD (variable length decoder), 9 an input of which is coupled to output 5, and with inverse quantization means 10, an input of which is coupled to an output of VLD 9 and a control input of which is coupled to quantization control signal output 8. Furthermore, data reprocessing means 3 are provided with inverse transformation means 11, an input of which is coupled to an output of inverse quantization means 10, with a combining device 12 (addition circuit), a first input of which is coupled to an output of transformation means 11, with memory means 13, an input of which is coupled to an output of combining device 12, and with prediction means 14, an input of which is coupled to an output of memory means 13 and an output of which is coupled to a second input of combining device 12 and a first control input of which is coupled to vector output 6 and a second control input of which is coupled to mode output 7. The output of combining device 12 is furthermore coupled to an output 15 of data reprocessing means 3.

Coding section 21 comprises multiplexing means, or multiplexer, 22 and data processing means 23. Multiplexer 22 has a first input 25 for coupling to an output of data processing means 23, a second input which is made up of a vector input 26 for receiving a vector signal, a mode input 27 for receiving a mode signal, and a quantization control signal input 28 for receiving a quantization control signal, and an output 24 for generating a second coded bit stream. Data processing means 23 are provided with quantization means 32, and with coding means, or VLC (variable length coder), 33 an input of which is coupled to an output of quantization means 32 and an output of which is coupled to input 25. Furthermore, data processing means 23 are provided with a combining device 30 (subtraction circuit), a first input of which is coupled to an input 29 of data processing means 23, with transformation means 31, an input of which is coupled to an output of combining device 30 and an output of which is coupled to an input of quantization means 32, with inverse quantization means 34, an input of which is coupled to the output of quantization means 32, with inverse transformation means 35, an input of which is coupled to an output of inverse quantization means 34, with combining circuit 36 (addition circuit), a first input of which is coupled to an output of inverse transformation means 35, with memory means 37, an input of which is coupled to an output of combining device 36, and with prediction means 38, an input of which is coupled to an output of memory means 37 and an output of which is coupled to a second input of combining device 30 and to a second input of combining device 36 and a first control input of which is coupled to vector input 26 and a second control input of which is coupled to mode input 27.

Output 15 and input 29 are mutually connected via coupling 39, which coupling is, in its simplest form, a through connection, and, in a more complex form, is, for example, a post processor known to the person skilled in the art or, for example, is a temporal and/or spatial converter known to the person skilled in the art. Vector output 6 and vector input 26 are mutually connected via a further coupling 40 and mode output 7 and mode input 27 are mutually connected via a further coupling 41. A simplest form of further coupling 40 is a through connection, whereas a more complex form is, for example, a translation unit 40 known to the person skilled in the art, the vector signal of the vector output 6 being converted into another vector signal for vector input 26 in order to make it possible, for example, to translate from one standard into another standard, it sometimes being necessary to adjust the accuracy and/or range of the vector information. There is also the possibility that different vector signals have to be combined to form one vector signal. A simplest form of further coupling 41 is a through connection, whereas a more complex form is, for example, a translation/determination unit 41 known to the person skilled in the art, the mode signal of mode output 7 being converted into another mode signal for mode input 27 in order to make it possible, for example, to translate one standard into another standard, it sometimes being necessary to redetermine the mode signal, as has to be done, correspondingly, in separate encoders. If the temporal and/or spatial converter 39 is used, vector information and/or mode information is economized to a greater or lesser extent per interval of time; the translation unit and translation/determination unit then have to be adjusted by converter 39 via connections not shown in FIG. 1.

Control unit 17, which could also be regarded as a further coupling, is provided with an input 18, coupled to quantization control signal output 8, for receiving the quantization control signal, with an output 19, coupled to output 24, for receiving the second coded bit stream, and with an output 20, coupled to input 28 and to a control input of quantization means 32 and to a control input of inverse quantization means 34, for supplying a further quantization control signal. Control unit 17 furthermore generally has a preset input, not shown in FIG. 1, for setting an adjustable ratio, the so-called input/output bit rate.

The operation of the transcoder shown in FIG. 1 is as follows. Multiplexer 2 receives, at input 4, the first coded bit stream, which is split up into a signal which is fed via output 5 to VLD 9, into a vector signal which is fed via vector output 6 to the first control input of prediction means 14 and to further coupling (translation unit) 40, into a mode signal which is fed via mode output 7 to the second control input of prediction means 14 and to further coupling (translation/determination unit) 41, and into a quantization control signal which is fed via quantization output 8 to the control input of inverse quantization means 10 and to input 18 of control unit 17. VLD 9 performs a decoding, for example on the basis of a table, after which inverse quantization means 10 perform an inverse quantization and inverse transformation means 11 perform an inverse transformation, for example an inverse discrete cosine transformation. In this way, a data signal is obtained which is the difference between a particular group of picture elements, or pixels, of a particular picture and a particular group of pixels of a picture preceding it. With the aid of the feedback loop containing therein the prediction means 14 (motion compensation means) and the memory means 13, the particular group of pixels of the particular picture then appears as a data signal at output 15. If account is taken of movements in the picture content of consecutive pictures during coding, this is compensated for by prediction means 14 (motion compensation means) in response to the vector signal and/or the mode signal. From output 15, said data signal flows (possibly via the temporal and/or spatial converter 39 to economize on vector information and/or mode information) to input 29, a predetermined number of bits thus forming a picture element or pixel. Assuming that the capacity of memory means 37 is unoccupied, a first group of pixels reaches, via combining device 30, the transformation means 31, which perform, for example, a discrete cosine transformation on the group of pixels, the associated coefficient being determined for each frequency component. The quantization means 32 quantize the signal obtained. The quantized signal is then coded by VLC 33, for example on the basis of a table with which new code words are generated which, on average, have a shorter length than the incoming words, and is fed to input 25 of multiplexer 22. This transformed, quantized and coded first group of pixels consequently forms the first section of the coded signal. After being transformed and quantized, the first group of pixels is inversely quantized by inverse quantization means 34 and inversely transformed by inverse transformation means 35, and stored at a first location in memory means 37 via combining device 36. A second group of pixels traverses the same route as the first group of pixels, undergoes the same operations and is stored at a second location in memory means 37, etc., until all the groups of pixels of one complete picture (the first picture) have been stored. The first group of pixels of the subsequent (second) picture is then presented to input 29. In this connection, it is conceivable that prediction means 38 (motion estimation means) make a prediction (estimation), on the basis of a connection to input 29 not shown in FIG. 1, of a possible movement in the picture in order to improve the quality of the coding. At the same time, (the prediction of) the first group of pixels of the preceding (first) picture is fed via prediction means 38 to the first group of pixels of the (second) picture to be coded via combining device 30. Because the difference between the first group of pixels of the second picture and the first group of pixels of the first picture is then presented to the remainder of data processing means 23, the coding proceeds appreciably more efficiently. Taking account of any movements in the picture content of consecutive pictures by means of the prediction means 38 increases the efficiency still further. Instead of vectors, other prediction parameters determined on the basis of other prediction methods can, of course, be transmitted.

What is described above is the operation of the transcoder in regard to a first layer which is shown in FIG. 1 and which is built up around data reprocessing means 3 and data processing means 23. The operation in regard to a second layer, which is not shown in FIG. 1, for the purpose of pyramidal or layered coding and decoding and built up around further reprocessing means and further data processing means is, in principle, identical and is described comprehensively in the references mentioned.

According to the transcoder shown in FIG. 1, the second coded bit stream represents the video signal in accordance with the same standard as the first coded bit stream, but with one or more modified coding parameters, such as picture size, picture frequency and picture coding procedure, or in accordance with a standard other than the first coded bit stream.

In the case of conventional transcoders, there is no input 18 in control unit 17 for receiving the quantization control signal from quantization control signal output 8. Furthermore, the further couplings 40 and 41 are not present in such cases, and each information signal (quantization control signal, vector signal, mode signal) is recomputed in the coding section, the data signal to be transported via coupling 39 representing the video signal per se in uncoded form. The computation takes place on the basis of said data signal.

Owing to the passing of information signals from the decoding section 1 to the coding section 21, these information signals no longer have to be computed in the coding section 21, which thus economizes on computation.

If the transcoder according to the invention is regarded as a linear system, a simplified version of control unit 17 operates as follows. Because it is approximately true that (decoding section quantization)/(coding section quantization)=(outgoing data)/(incoming data), that (incoming data+incoming information)/(outgoing data+outgoing information)=(adjustable ratio) and that (incoming information)=outgoing information), all the parameters being known or having to be set except (coding section quantization) and (outgoing data), the control unit computes these two unknown parameters on the basis of the above equations, after which the coding section is fed a certain quantization control signal. A subsequent (partial) coding is performed with the latter and this leads to new outgoing data, which are fed back to control unit 17. This produces a certain error, which results in further adjustment in the computation of the subsequent quantization control signal.

Figure 2:
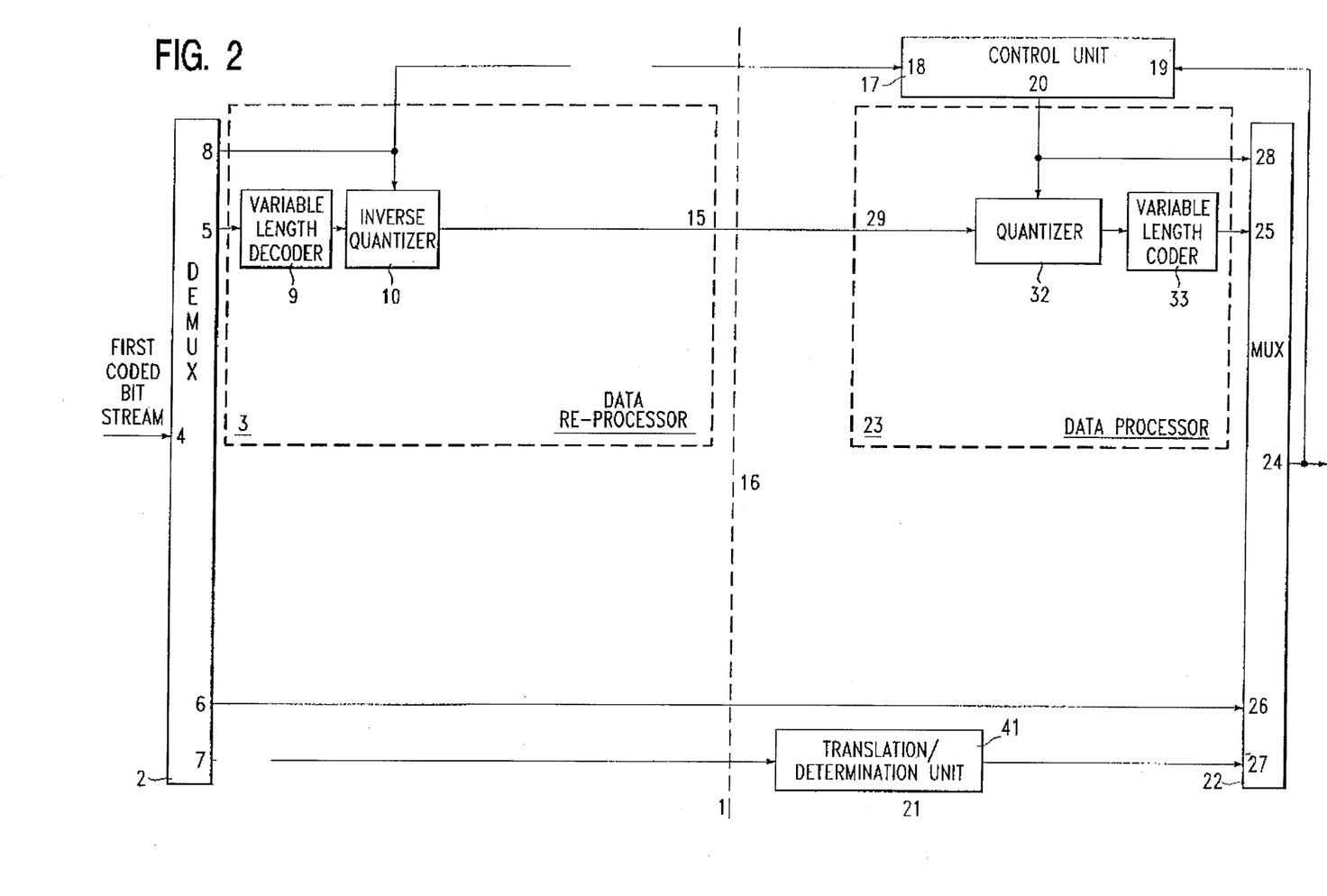
FIG. 2 shows a less complex version of a transcoding device according to the invention.

The transcoding device, or transcoder, shown in FIG. 2 is made up of a decoding section 1 and a coding section 21, mutually separated by broken line 16. Decoding section 1 comprises demultiplexing means, or demultiplexer, 2 and data reprocessing means 3. Demultiplexer 2 has an input 4 for receiving a first coded bit stream, a first output 5 for coupling to an input of data reprocessing means 3, and a second output which is made up of a vector output 6 for generating a vector signal, a mode output 7 for generating a mode signal, and a quantization control signal output 8 for generating a quantization control signal. Data reprocessing means 3 are provided with decoding means, or VLD (variable length decoder), 9 an input of which is coupled to output 5, and with inverse quantization means 10, an input of which is coupled to an output of VLD 9 and a control input of which is coupled to quantization control signal output 8 and an output of which is coupled to an output 15 of data reprocessing means 3.

Coding section 21 comprises multiplexing means, or multiplexer, 22 and data processing means 23. Multiplexer 22 has a first input 25 for coupling to an output of data processing means 23, a second input which is made up of a vector input 26 for receiving a vector signal, a mode input 27 for receiving a mode signal, and a quantization control signal input 28 for receiving a quantization control signal, and an output 24 for generating a second coded bit stream. Data processing means 23 are provided with quantization means 32, an input of which is coupled to an input 29 of data processing means 23 and a control input of which is coupled to quantization control signal input 28, and with coding means, or VLC (variable length coder), 33 an input of which is coupled to an output of quantization means 32 and an output of which is coupled to input 25.

Output 15 and input 29 are mutually connected via a coupling 39, which is not shown in FIG. 2, which coupling is in this case a through connection. Vector output 6 and vector input 26 are mutually connected via a further coupling 40, which is not shown in FIG. 2, and mode output 7 and mode input 27 are mutually connected via a further coupling 41. In this case, further coupling 40 is a through connection, whereas further coupling 41 is a translation/determination unit 41 known to the person skilled in the art, the mode signal of mode output 7 being converted into another mode signal for mode input 27 because, even if no translation is necessary from one standard to another standard, it is nevertheless sometimes necessary to redetermine the mode signal, as occurs, correspondingly, in separate encoders, all this being dependent on the data processing means 23.

Control unit 17, which could also be regarded as a further coupling, is provided with an input 18, coupled to the quantization control signal output 8, for receiving the quantization control signal, with an input 19, coupled to output 24, for receiving the second coded bit stream, and with an output 20, coupled to the quantization control signal input 28 and to a control input of quantization means 32, for supplying a further quantization control signal. Control unit 17 furthermore generally has a preset input, not shown in FIG. 2, for setting an adjustable ratio, the so-called input/output bit rate.

The operation of the transcoder shown in FIG. 2 is as follows. Multiplexer 2 receives, at input 4, the first coded bit stream, which is split up into a signal which is fed via output 5 to VLD 9, into a vector signal which is fed via vector output 6 to the coding section 21, into a mode signal which is fed via mode output 7 to further coupling (translation/determination unit) 41 and into a quantization control signal which is fed via quantization output 8 to the control input of inverse quantization means 10 and to input 18 of control unit 17. VLD 9 performs a decoding, for example on the basis of a table, after which inverse quantization means 10 perform an inverse quantization. In this way, a data signal is obtained at output 15 which is the difference between a particular group of picture elements, or pixels, of a particular picture and a particular group of pixels of a picture preceding it.

Said data signal is therefore still in a certain transformation domain as a consequence of the lack of inverse transformation means and thus represents a video signal which is still to some extent coded. From output 15, said data signal flows to input 29. The quantization means 32 quantize said data signal. The quantized signal is then coded by VLC 33, for example on the basis of a table with which new code words are generated which have, on average, a shorter length than the incoming words, and is fed to input 25 of multiplexer 22. This quantized and coded signal is then converted, together with the quantization control signal computed by control unit 17, the unmodified vector signal and any adjusted mode signal, into the second coded bit stream by multiplexer 22.

According to this transcoder, the second coded bit stream represents the video signal in accordance with the same standard as the first coded bit stream, but at a lower bit rate.

Compared with the transcoder shown in FIG. 1, further coupling 40, or translation unit 40, is lacking in the transcoder shown in FIG. 2 because the vector signal from vector output 6 does not need to be converted into another vector signal for vector input 26 as a consequence of the fact that no translation from one standard into the other standard is necessary, and no adjustment of the accuracy and/or range of the vector information is necessary, and that no vector signals need to be combined to form one vector signal. Further coupling 41, or translation/determination unit 41, is, however, still present in the transcoder shown in FIG. 2 because, while the same standard has been retained, data processing means 23 may nevertheless make a mode change necessary, in which case they drive translation/determination unit 41, via a connection which is not shown in FIG. 2.

We claim:

1. A transcoding device comprising:

a decoding section having:

data reprocessing means, having an input and an output, for generating a data signal; and demultiplexing means, having an input, for receiving a first coded bit stream and having a first output coupled to the input of the data reprocessing means and having a second output for generating at least one information signal; and a coding section having:

data processing means, having an input coupled to the output of the data reprocessing means, for receiving the data signal; and multiplexing means, having a first input coupled to an output of the data processing means, having a second input coupled to the second output of the demultiplexing means and having an output, for receiving at least one information signal and for generating a second coded bit stream; and characterized in that the data reprocessing means has a control input and that the data processing means has a control input, with the control inputs of both of the processing means and the data reprocessing means being coupled to the second output of the demultiplexing means.

2. The transcoding device according to claim 1, characterized in that the information signal comprises a quantization signal, and in the decoding section:

the second output of the demultiplexing means comprises a quantization signal output; and the control input of the data reprocessing means comprises a quantization signal control input; and in the coding section:

the second input of the multiplexing means comprises a quantization signal input; and the control input of the data processing means comprises a quantization signal control input.

3. The transcoding device according to claim 2, characterized in that:

the data reprocessing means comprises decoding means and first inverse quantization means, the first inverse quantization means being provided with an input coupled to an output of the decoding means and with a control input coupled to the quantization signal applied to the control input of the data reprocessing means; and the data processing means comprises quantization means and coding means, the quantization means being provided with an output coupled to an input of the coding means and with a control input coupled to the quantization signal applied to the control input of the data processing means.

4. The transcoding device according to claim 3, characterized in that the data processing means further comprises second inverse quantization means, the second inverse quantization means having an input coupled to the output of the quantization means and having a control input coupled to the quantization signal applied to the control input of the data processing means.

5. The transcoding device according to claim 4, characterized in that:

in the decoding section:

the data reprocessing means further comprises inverse transformation means, first memory means, first combining means and first prediction means; wherein an input of the inverse transformation means is coupled to an output of the inverse quantization means, an output of the inverse transformation means is coupled to a first input of the first combining means, an output of the first prediction means is coupled to a second input of the first combining means, and an output of the first combining means is coupled to an input of the first prediction means via the first memory means; and in the coding section:

the data processing means further comprises transformation means, second memory means, second combining means, inverse transformation means and second prediction means; wherein an output of the transformation means is coupled to an input of the quantization means, an input of the transformation means is coupled to an output of the second combining means, an input of the inverse transformation means is coupled to an output of the inverse quantization means, an output of the inverse transformation means is coupled to an input of the second prediction means via the second memory means, and an output of the second prediction means is coupled to an input of the second combining means.

6. The transcoding device according to claim 5, characterized in that the information signal comprises a vector signal, and in the decoding section:

the second output of the demultiplexing means comprises a vector signal output; and the control input of the data reprocessing means comprises a vector signal control input which is coupled to a vector signal control input of the first prediction means; and in the coding section:

the second input of the multiplexing means comprises a vector signal input; and the control input of the data processing means comprises a vector signal control input which is coupled to a vector signal control input of the second prediction means.

7. The transcoding device according to claim 6, characterized in that the information signal comprises a mode signal, and in the decoding section:

the second output of the demultiplexing means comprises a mode signal output; and the control input of the data reprocessing means comprises a mode signal control input which is coupled to a mode signal control input of the first prediction means; and in the coding section:

the second input of the multiplexing means comprises a mode signal input; and the control input of the data processing means comprises a mode signal control input which is coupled to a mode signal control input of the second prediction means.

8. The transcoding device according to claim 5, characterized in that the information signal comprises a mode signal, and in the decoding section:

the second output of the demultiplexing means comprises a mode signal output; and the control input of the data reprocessing means comprises a mode signal control input which is coupled to a mode signal control input of the first prediction means; and in the coding section:

the second input of the multiplexing means comprises a mode signal input; and the control input of the data processing means comprises a mode signal control input which is coupled to a mode signal control input of the second prediction means.

9. The transcoding device according to claim 1, characterized in that the information signal comprises a vector signal, and in the decoding section:

the second output of the demultiplexing means comprises a vector signal output; and the control input of the data reprocessing means comprises a vector signal control input; and in the coding section:

the second input of the multiplexing means comprises a vector signal input; and the control input of the data processing means comprises a vector signal control input.

10. The transcoding device according to claim 9, characterized in that:

in the decoding section:

the data reprocessing means comprises decoding means, first memory means, first inverse quantization means, first inverse transformation means, first combining means and first prediction means; wherein an input of the first inverse quantization means is coupled to an output of the decoding means, an output of the first inverse quantization means is coupled to an input of the first inverse transformation means, an output of the first inverse transformation means is coupled to a first input of the first combining means, an output of the first prediction means is coupled to a second input of the first combining means and an output of the first combining means is coupled to an input of the first prediction means via the first memory means, the first prediction means being provided with a vector signal control input coupled to the vector signal control input of the data reprocessing means; and in the coding section:

the data processing means comprises second combining means, second memory means, transformation means, quantization means, coding means, second inverse quantization means, second inverse transformation means and second prediction means; wherein an output of the transformation means is coupled to an input of the quantization means, an input of the transformation means is coupled to an output of the second combining means, an output of the quantization means is coupled to an input of the coding means, the output of the quantization means is coupled to an input of the second inverse quantization means, an input of the second inverse transformation means is coupled to an output of the second inverse quantization means, an output of the second inverse transformation means is coupled to an input of the second prediction means via the second memory means, and an output of the second prediction means is coupled to an input of the second combining means, the second prediction means being provided with a vector signal control input coupled to the vector signal control input of the data processing means.

11. The transcoding device according to claim 10, characterized in that the information signal comprises a mode signal, and in the decoding section:

the second output of the demultiplexing means comprises a mode signal output; and the control input of the data reprocessing means comprises a mode signal control input which is coupled to a mode signal control input of the first prediction means; and in the coding section:

the second input of the multiplexing means comprises a mode signal input; and the control input of the data processing means comprises a mode signal control input which is coupled to a mode signal control input of the second prediction means.

12. The transcoding device according to claim 1, characterized in that the information signal comprises a mode signal, and in the decoding section:

the second output of the demultiplexing means comprises a mode signal output; and the control input of the data reprocessing means comprises a mode signal control input; and in the coding section:

the second input of the multiplexing means comprises a mode signal input; and the control input of the data processing means comprises a mode signal control input.

13. The transcoding device according to claim 12, characterized in that:

in the decoding section:

the data processing means comprises decoding means, first memory means, first inverse quantization means, first inverse transformation means, first combining means and first prediction means; wherein an input of the first inverse quantization means is coupled to an output of the decoding means, an output of the first inverse quantization means is coupled to an input of the first inverse transformation means, an output of the first inverse transformation means is coupled to a first input of the first combining means, an output of the first prediction means is coupled to a second input of the first combining means and an output of the first combining means is coupled to an input of the first prediction means via the first memory means, the first prediction means being provided with a mode signal control input coupled to the mode signal control input of the data reprocessing means; and in the coding section:

the data processing means comprises second combining means, second memory means, transformation means, quantization means, coding means, second inverse quantization means, second inverse transformation means and second prediction means; wherein an output of the transformation means is coupled to an input of the quantization means, an input of the transformation means is coupled to an output of the second combining means, an output of the quantization means is coupled to an input of the coding means, the output of the quantization means is coupled to an input of the second inverse quantization means, an input of the second inverse transformation means is coupled to an output of the second inverse quantization means, an output of the second inverse transformation means is coupled to an input of the second prediction means via the second memory means, and an output of the second prediction means is coupled to an input of the second combining means, the second prediction means being provided with a mode signal control input coupled to the mode signal control input of the data processing means.

14. The transcoding device according to claim 2, characterized in that the transcoding device further comprises a control unit, a first input of the control unit being coupled to the quantization signal output of the demultiplexing means, a second input of the control unit being coupled to the output of the multiplexing means, and an output of the control unit being coupled to quantization signal control input of the data processing means.

15. The transcoding device according to claim 3, characterized in that the transcoding device further comprises a control unit, a first input of the control unit being coupled to the quantization signal output of the demultiplexing means, a second input of the control unit being coupled to the output of the multiplexing means, and an output of the control unit being coupled to quantization signal control input of the data processing means.

16. The transcoding device according to claim 5, characterized in that the transcoding device further comprises a control unit, a first input of the control unit being coupled to the quantization signal output of the demultiplexing means, a second input of the control unit being coupled to the output of the multiplexing means, and an output of the control unit being coupled to quantization signal control input of the data processing means.

17. The transcoding device according to claim 6, characterized in that the transcoding device further comprises a control unit, a first input of the control unit being coupled to the quantization signal output of the demultiplexing means, a second input of the control unit being coupled to the output of the multiplexing means, and an output of the control unit being coupled to quantization signal control input of the data processing means.

18. The transcoding device according to claim 7, characterized in that the transcoding device further comprises a control unit, a first input of the control unit being coupled to the quantization signal output of the demultiplexing means, a second input of the control unit being coupled to the output of the multiplexing means, and an output of the control unit being coupled to quantization signal control input of the data processing means.

19. The transcoding device according to claim 8, characterized in that the transcoding device further comprises a control unit, a first input of the control unit being coupled to the quantization signal output of the demultiplexing means, a second input of the control unit being coupled to the output of the multiplexing means, and an output of the control unit being coupled to quantization signal control input of the data processing means.

20. The transcoding device according to claim 6, characterized in that the transcoding device further comprises a translation unit, an input of the translation unit being coupled to the vector signal output of the demultiplexing means, and an output of the translation unit being coupled to the vector signal control input of the data processing means and to the vector signal input of the multiplexing means.

21. The transcoding device according to claim 7, characterized in that the transcoding device further comprises a translation unit, an input of the translation unit being coupled to the vector signal output of the demultiplexing means, and an output of the translation unit being coupled to the vector signal control input of the data processing means and to the vector signal input of the multiplexing means.

22. The transcoding device according to claim 9, characterized in that the transcoding device further comprises a translation unit, an input of the translation unit being coupled to the vector signal output of the demultiplexing means, and an output of the translation unit being coupled to the vector signal control input of the data processing means and to the vector signal input of the multiplexing means.

23. The transcoding device according to claim 10, characterized in that the transcoding device further comprises a translation unit, an input of the translation unit being coupled to the vector signal output of the demultiplexing means, and an output of the translation unit being coupled to the vector signal control input of the data processing means and to the vector signal input of the multiplexing means.

24. The transcoding device according to claim 11, characterized in that the transcoding device further comprises a translation unit, an input of the translation unit being coupled to the vector signal output of the demultiplexing means, and an output of the translation unit being coupled to the vector signal control input of the data processing means and to the vector signal input of the multiplexing means.

25. The transcoding device according to claim 7, characterized in that the transcoding device further comprises a translation/determination unit, an input of the translation/determination unit being coupled to the mode signal output of the demultiplexing means, and an output of the translation/determination unit being coupled to the mode signal control input of the data processing means and to the mode signal input of the multiplexing means.

26. The transcoding device according to claim 8, characterized in that the transcoding device further comprises a translation/determination unit, an input of the translation/ determination unit being coupled to the mode signal output of the demultiplexing means, and an output of the translation/determination unit being coupled to the mode signal control input of the data processing means and to the mode signal input of the multiplexing means.

27. The transcoding device according to claim 11, characterized in that the transcoding device further comprises a translation/determination unit, an input of the translation/determination unit being coupled to the mode signal output of the demultiplexing means, and an output of the translation/determination unit being coupled to the mode signal control input of the data processing means and to the mode signal input of the multiplexing means.

28. The transcoding device according to claim 12, characterized in that the transcoding device further comprises a translation/determination unit, an input of the translation/determination unit being coupled to the mode signal output of the demultiplexing means, and an output of the translation/determination unit being coupled to the mode signal control input of the data processing means and to the mode signal input of the multiplexing means.

29. The transcoding device according to claim 13, characterized in that the transcoding device further comprises a translation/determination unit, an input of the translation/determination unit being coupled to the mode signal output of the demultiplexing means, and an output of the translation/determination unit being coupled to the mode signal control input of the data processing means and to the mode signal input of the multiplexing means.

30. The transcoding device according to claim 4, characterized in that the transcoding device further comprises a control unit, a first input of the control unit being coupled to the quantization signal output of the demultiplexing means, a second input of the control unit being coupled to the output of the multiplexing means, and an output of the control unit being coupled to quantization signal control input of the data processing means.

* * * * *